(No Model.)  2 Sheets—Sheet 1.

J. M. HOLDEN.
STOCK CAR.

No. 267,530. Patented Nov. 14, 1882.

WITNESSES
Edmund Pope
George M. Given

INVENTOR
Joel M. Holden (No Model.) 2 Sheets—Sheet 2.

J. M. HOLDEN.
STOCK CAR.

No. 267,530. Patented Nov. 14, 1882.

WITNESSES
Edmund Pope
George M. Given

INVENTOR
Joel M. Holden

UNITED STATES PATENT OFFICE.

JOEL M. HOLDEN, OF BOSTON, MASSACHUSETTS.

STOCK-CAR.

SPECIFICATION forming part of Letters Patent No. 267,530, dated November 14, 1882.

Application filed July 10, 1882. (No model.)

*To all whom it may concern:*

Be it known that I, JOEL M. HOLDEN, a citizen of the United States, residing at Boston, county of Suffolk, and Commonwealth of Massachusetts, have invented certain new and useful Improvements in Stock-Cars, (which have not been patented to myself or to others, with my consent or knowledge, in any foreign country;) and I do hereby declare that the following is a full, clear, and exact description, which will enable others to make and use the same.

My invention relates to improvements in cars for carrying stock or cattle, preventing the necessity of unloading them to feed or water them, and the subsequent reloading, thus saving expense and time and preventing the cruel treatment of animals in carrying them long distances without food or water, unloading them, and reloading.

By my improvement each animal is properly fed and watered in the cars, having separate troughs for food and water, and no loss of time occurs in loading or unloading, and much less expense attends their transport. I attain these objects by the devices and arrangements illustrated in the accompanying drawings, in which—

Figure 1:
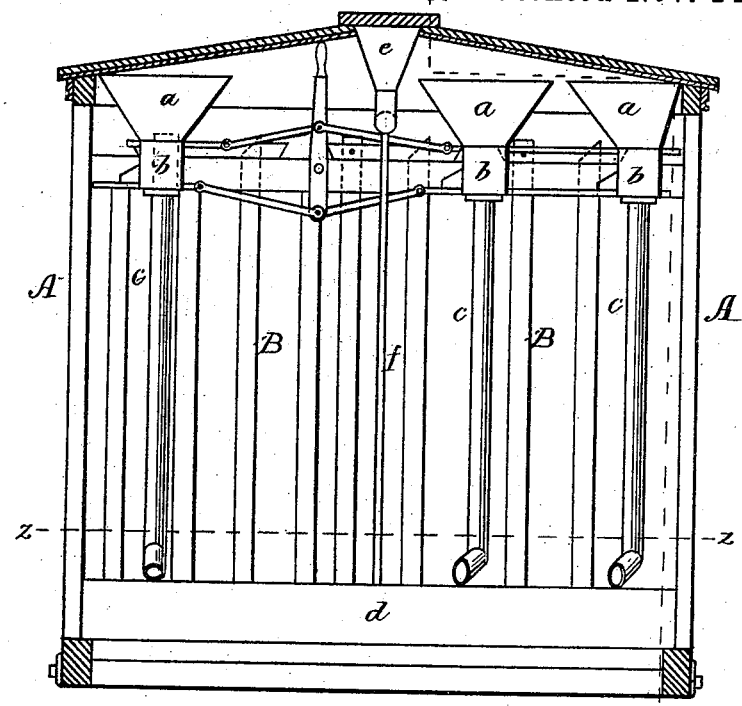
Figure 2:
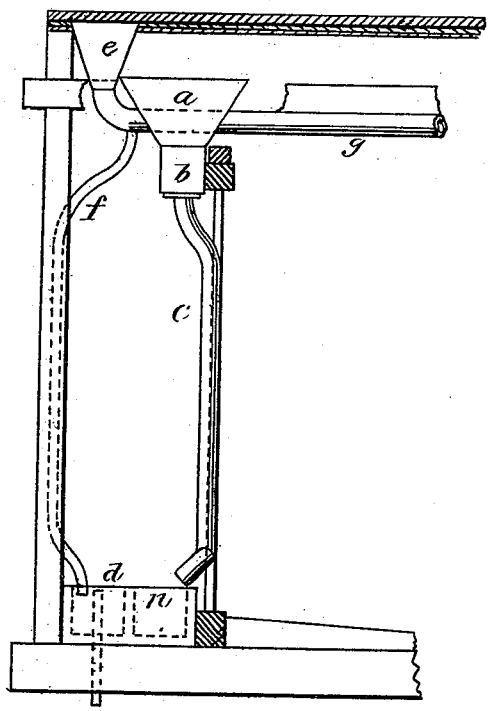
Figure 3:
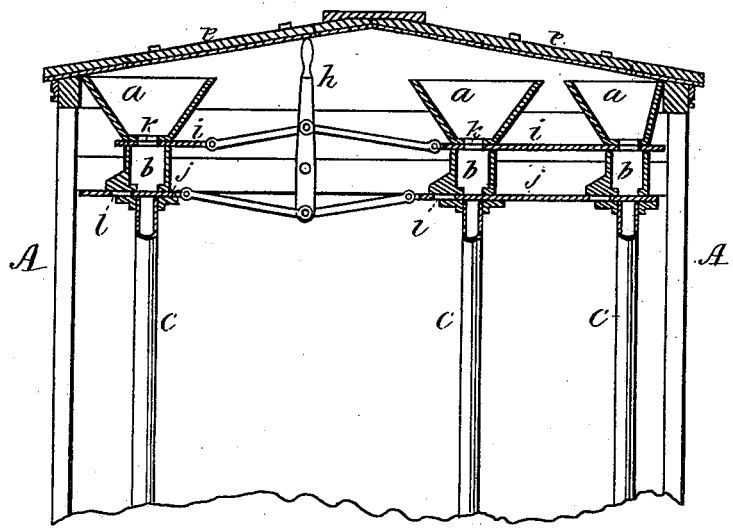
Figures 4, 5:
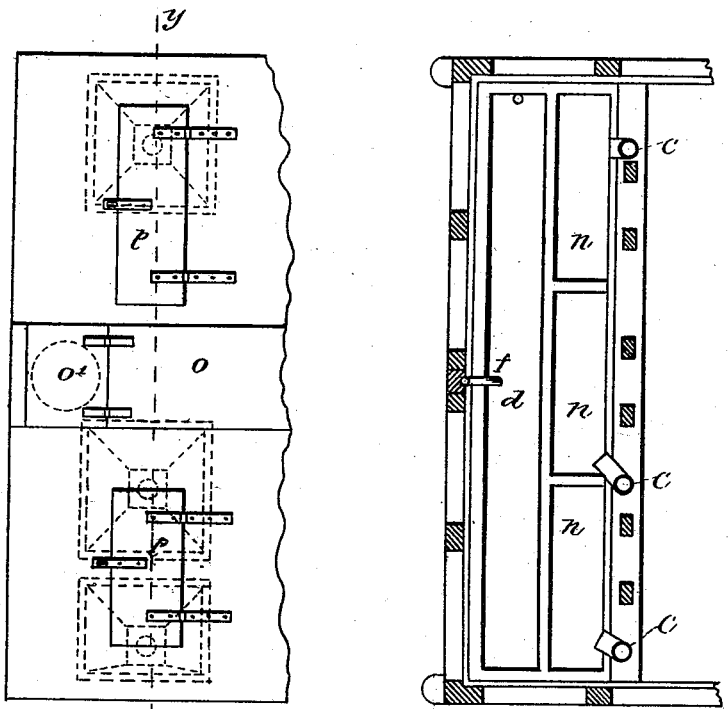

Figure 1 is an interior view taken from one end of the car. Fig. 2 is a longitudinal section of one end of the car, taken on line z z, Fig. 1. Fig. 3 is a sectional view on line y y, Fig. 4. Fig. 4 is a plan of one end of the car. Fig. 5 is a section of the same, taken on line z z, Fig. 1.

A represents the end of the car. B represents the cattle-stanchions, serving to keep the animals in place. *a a a a* are tunnel-mouth bins holding a bushel (more or less) of grain or other animal food. *b b b* are receptacles under said tunnel-mouth bins, of size sufficient to hold enough food for each animal, the bottom of said bins and food-receptacles are opened and closed by levers *h* and rods and sliding plates *i i* and *j j*, so that one movement of the lever opens the bottom of the food-receptacles and closes the outlet of the tunnel-mouth bins, and vice versa. Pipes of requisite dimensions lead from each food-receptacle into a feed-trough in front of each animal. Doors on the top of the car, *p p*, enable the bins to be filled as desired. Thus one movement of the lever supplies the requisite quantity of food to each animal on that line.

It is desirable also that separate troughs should be used for food and water.

In the drawings, *n* represents the food-trough, and *d* the water-trough.

Heretofore, in some instances, the ridge-beam of the car-body has been made trough-shaped, into which the water is received from the roadside water-crane, and from thence conducted by vertical pipes into the drinking-trough; but such a ridge-beam trough would be impractical. I therefore use a tunnel-mouth pipe, (marked *e* upon the drawings,) into which the water-crane on the roadside may be readily placed, and from thence horizontal pipes *g* issue, conveying the water, and smaller distributing-pipes, *f*, lead into the water-troughs *d* in front of each animal. The walking-planks (marked *o*) on the top of the car, with a hinge, form a door or cover, *o*, for the water-tunnel, which is flush with the roof of the car, serving to keep out dust and cinders. By these improvements, and by means of the doors and openings in the top of the car, the train-men, by operating the levers, can supply the cattle with sufficient food in measured quantity for each animal, and by means of the water-pipes, as described, they can be supplied with water, thus carrying them comfortably at much less expense without loss of time, and they will arrive at their journey's end in as good or in better condition than when placed in the cars.

I am aware that feed-troughs, reservoirs for food, water-tanks, and conducting-pipes have been applied to stock cars, and therefore do not claim them broadly; but I claim the construction and combination of the devices herein described, as set forth in the claims.

Having described my invention, what I claim as new therein, and desire to secure by Letters Patent, is—

1. A stock-car having a multiple trough extending transversely across the car, provided with feed-compartments *n* and a water-compartment, *d*, arranged side by side, each feed-compartment being supplied through a vertical pipe direct from the bottom of a measuring-receptacle connected at its top to a tunnel-mouthed bin, the top of which bin is below the roof of the car, each bin being filled through a separate trap door directly above it in the roof, the said receptacles and bins being provided with two sets of sliding plates having openings for regulating and measuring the feed, and operated by rods and levers, while the water-compartment is supplied through a vertical pipe leading to a horizontal pipe which connects with a vertical tunnel-mouthed pipe, $e$, extending to the top of the car, substantially as described.

2. A stock-car having a water-trough, a tunnel-mouthed supply-pipe placed beneath the walking-plank of the car, and a pipe connecting the trough and tunnel-mouthed supply-pipe, the top of said tunnel-mouthed pipe being flush with the roof of the car and covered by the walking-plank, which latter is hinged to admit of access to the tunnel, substantially as described.

JOEL M. HOLDEN.

Witnesses:
GEORGE E. BELTON,
GEO. D. BURTON.